(12) United States Patent
Boloorian et al.

(10) Patent No.: US 11,378,691 B2
(45) Date of Patent: Jul. 5, 2022

(54) GENERATION OF LIDAR DATA FROM OPTICAL SIGNALS

(71) Applicant: SiLC Technologies, Inc., Monrovia, CA (US)

(72) Inventors: Majid Boloorian, San Diego, CA (US); Dazeng Feng, El Monte, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 833 days.

(21) Appl. No.: 16/258,305

(22) Filed: Jan. 25, 2019

(65) Prior Publication Data

US 2019/0353789 A1 Nov. 21, 2019

Related U.S. Application Data

(60) Provisional application No. 62/726,101, filed on Aug. 31, 2018, provisional application No. 62/671,913, filed on May 15, 2018.

(51) Int. Cl.
*G01S 17/42* (2006.01)
*G02B 6/10* (2006.01)
*G01S 17/04* (2020.01)

(52) U.S. Cl.
CPC .............. *G01S 17/42* (2013.01); *G01S 17/04* (2020.01); *G02B 6/10* (2013.01)

(58) Field of Classification Search
CPC ........ G01S 17/42; G01S 17/04; G01S 7/4818; G01S 7/4917; G01S 7/4817; G01S 17/34; G01S 17/58; G02B 6/10
See application file for complete search history.

(56) References Cited

U.S. PATENT DOCUMENTS

| | | |
|---|---|---|
| 2002/0105632 A1 | 8/2002 | Holton |
| 2013/0083389 A1 | 4/2013 | Dakin et al. |
| 2014/0376001 A1* | 12/2014 | Swanson ................ G01N 21/17 356/479 |
| 2015/0185244 A1 | 7/2015 | Inoue et al. |
| 2016/0299228 A1 | 10/2016 | Maleki et al. |

FOREIGN PATENT DOCUMENTS

EP 2796890 A1 10/2014

OTHER PUBLICATIONS

Kang, Sung Chul, International Search Report and Written Opinion, PCT/US2019/032419, Korean Patent Office, dated Sep. 20, 2019.
Wittmann-Regis, Agnes, International Preliminary Report on Patentability and Written Opinion, PCT/US2019/032419, The International Bureau of WIPO, dated Nov. 26, 2020.

* cited by examiner

Primary Examiner — Luke D Ratcliffe
Assistant Examiner — Sanjida Naser
(74) Attorney, Agent, or Firm — Gavrilovich, Dodd & Lindsey LLP (57) ABSTRACT

A LIDAR system includes optics that generate a light signal that carries LIDAR data that indicates a distance and/or radial velocity between the optics and an object located outside of the LIDAR system. Electronics are configured to convert the light signal to a first data electrical signal and a second data electrical signal. The electronics perform a Complex Fourier transform on a complex signal such that the first data electrical signals acts a real component of the complex signal and the second data electrical signals acts as an imaginary component of the complex signal. The electronics determine the LIDAR data from an output of the Complex Fourier transform.

16 Claims, 4 Drawing Sheets

GENERATION OF LIDAR DATA FROM OPTICAL SIGNALS

RELATED APPLICATIONS

This application claims the benefit of U.S. Provisional Patent Application No. 62/671,913, filed on May 15, 2018, entitled "Optical Sensor Chip;" and to U.S. Provisional Patent Application No. 62/726,101, filed on Aug. 31, 2018, entitled "Optical Sensor System;" each of which is incorporated herein in its entirety.

FIELD

The invention relates to optical devices. In particular, the invention relates to LIDAR systems.

BACKGROUND

There is an increasing commercial demand for 3D sensing systems that can be economically deployed in applications such as ADAS (Advanced Driver Assistance Systems) and AR (Augmented Reality). LIDAR (Light Detection and Ranging) systems are an example of a technology that can be used to construct these 3D images. LIDAR systems build these images by illuminating a scene with light and measuring the light signals that return to the LIDAR system from the illuminated scene.

Frequency Modulated Continuous Wave (FMCW) is an example of a coherent detection method that can be used for LIDAR applications. The FMCW technique is capable of determining both distance and radial velocity between an object and a LIDAR system in a single measurement period. Additionally, FMCW techniques have reduced sensitivity to ambient light and light from other LIDAR systems.

Many FMCW techniques resolve distance and radial velocity by performing a Discrete Fourier Transform (DFT) or Fast Fourier Transform (FFT) on an electrical signal that is a function of the distance and radial velocity between an object and the LIDAR system. However, for a given object, these Fourier transforms provide more than one possible solution. When the source of the LIDAR signal and reflecting object are not moving relative to one another or are moving slowly relative to one another, it is well-known which of the solutions to select. However, as the relative speed of the source and the reflecting object increases, it becomes unclear which of the solutions is the correct solution. This lack of clarity is particularly apparent for LIDAR as opposed to FMCW applications that use other forms of electromagnetic radiation, such as radar, because of the high carrier frequency of the light signal and the associated high Doppler shift frequency. As a result, there is a need for a LIDAR system that overcomes this ambiguity.

SUMMARY

A LIDAR system includes optics that generate a light signal that carries LIDAR data that indicates a distance and/or radial velocity between the optics and an object located outside of the LIDAR system. Electronics are configured to convert light from the light signal to a first data electrical signal and a second data electrical signal. The electronics perform a Complex Fourier transform on a complex signal such that the first data electrical signals acts as a real component of the complex signal and the second data electrical signals acts as an imaginary component of the complex signal. The electronics determine the LIDAR data from an output of the Complex Fourier transform.

A method of operating a LIDAR system includes generating multiple data electrical signals from a light signal that carries the LIDAR data. The method also includes performing a Complex Fourier transform on a complex signal such that a first one of the data electrical signals is a real component of the complex signal and a second one of the data electrical signals is an imaginary component of the complex signal. The method also includes using an output from the Complex Fourier transform to determine the distance and/or radial velocity between the source and the object.

An embodiment of a LIDAR system includes a utility waveguide that carries an outgoing LIDAR signal to a facet through which the outgoing LIDAR signal exits from the LIDAR system. An optical component combines a first portion of a reference signal with a first portion of a comparative signal so as to form a first composite signal. The reference signal includes a portion of the light from the outgoing LIDAR signal before the outgoing LIDAR signal exits from the LIDAR system and the comparative signal includes light from the outgoing LIDAR that was reflected off an object located remote from the LIDAR system. A second optical component combines a second portion of the reference signal with a second portion of the comparative signal so as to form a second composite signal. The first portion of the reference signal in the first composite signal being out of phase with the second portion of the reference signal in the second composite signal. In some instances, the first portion of the comparative signal in the first composite signal is in-phase with the second portion of the comparative signal in the second composite signal.

An embodiment of a LIDAR system includes a utility waveguide that carries an outgoing LIDAR signal to a facet through which the outgoing LIDAR signal exits from the LIDAR system. An optical component combines a first portion of a reference signal with a first portion of a comparative signal so as to form a first composite signal. The reference signal includes a portion of the light from the outgoing LIDAR signal before the outgoing LIDAR signal exits from the LIDAR system and the comparative signal includes light from the outgoing LIDAR that was reflected off an object located remote from the LIDAR system. A second optical component combines a second portion of the reference signal with a second portion of the comparative signal so as to form a second composite signal. The first portion of the comparative signal in the first composite signal being out of phase with the second portion of the comparative signal in the second composite signal. In some instances, the first portion of the reference signal in the first composite signal is in-phase with the second portion of the reference signal in the second composite signal.

DESCRIPTION

The LIDAR system is configured to generate multiple data electrical signals and to perform a Complex Fourier transform on a complex signal where one of the data electrical signals is a real component of the complex signal and another one of the data electrical signals is an imaginary component of the complex signal. The LIDAR system uses output from the Complex Fourier transform to generate LIDAR data (the distance and/or radial velocity between the LIDAR system and an object that reflects from the LIDAR system). The use of the Complex Fourier transform provides a non-ambiguous solution for the LIDAR data. As a result, there is no need to identify the correct LIDAR data solution.

Figure 1:
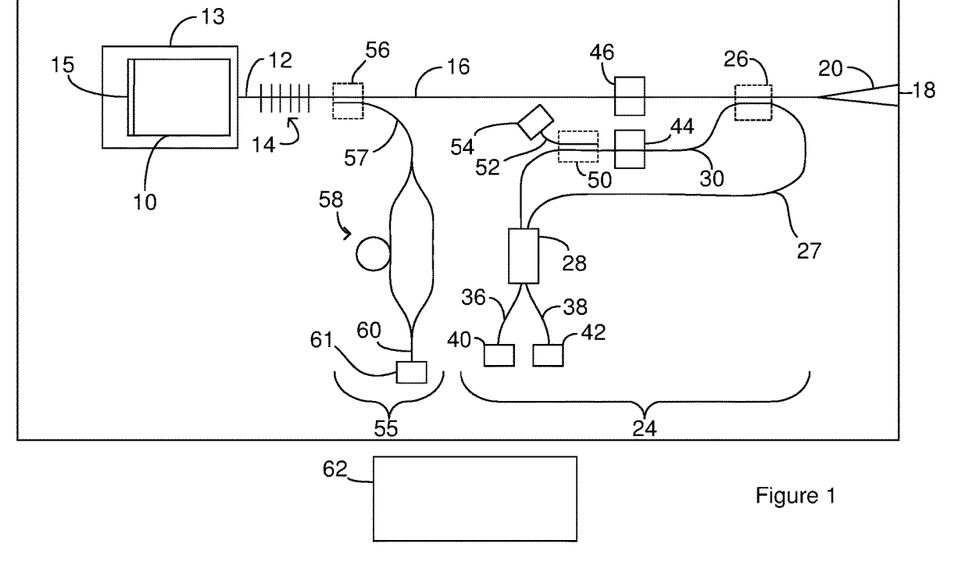
FIG. 1 is a top view of a LIDAR chip.

FIG. 1 is a topview of a LIDAR chip that includes a laser cavity. The laser cavity includes a light source 10 that can include or consist of a gain medium (not shown) for a laser. The chip also includes a cavity waveguide 12 that receives a light signal from the light source 10. The light source can be positioned in a recess 13 so a facet of the light source is optically aligned with a facet of the cavity waveguide 12 to allow the light source and cavity waveguide 12 to exchange light signals. The cavity waveguide 12 carries the light signal to a partial return device 14. The illustrated partial return device 14 is an optical grating such as a Bragg grating. However, other partial return devices 14 can be used; for instance, mirrors can be used in conjunction with echelle gratings and arrayed waveguide gratings.

The partial return device 14 returns a return portion of the light signal to the cavity waveguide 12 as a return signal. For instance, the cavity waveguide 12 returns the return signal to the light source 10 such that the return portion of the light signal travels through the gain medium. The light source 10 is configured such that at least a portion of the return signal is added to the light signal that is received at the cavity waveguide 12. For instance, the light source 10 can include a highly, fully, or partially reflective device 15 that reflects the return signal received from the gain medium back into the gain medium. As a result, light can resonate between the partial return device 14 and the reflective device 15 so as to form a Distributed Bragg Reflector (DBR) laser cavity. A DBR laser cavity has an inherently narrow-linewidth and a longer coherence length than DFB lasers and accordingly improves performance when an object reflecting the LIDAR output signal from the chip is located further away from the chip.

The partial return device 14 passes a portion of the light signal received from the cavity waveguide 12 to a utility waveguide 16 included on the chip. The portion of the light signal that the utility waveguide 16 receives from the partial return device 14 serves as the output of the laser cavity. The output of the laser cavity serves as an outgoing LIDAR signal on the utility waveguide 16. The utility waveguide 16 terminates at a facet 18 and carries the outgoing LIDAR signal to the facet 18. The facet 18 can be positioned such that the outgoing LIDAR signal traveling through the facet 18 exits the chip and serves as a LIDAR output signal. For instance, the facet 18 can be positioned at an edge of the chip so the outgoing LIDAR signal traveling through the facet 18 exits the chip and serves as a LIDAR output signal that includes or consists of light from the outgoing LIDAR signal.

The LIDAR output signal travels away from the chip and is reflected by objects in the path of the LIDAR signal. The reflected signal travels away from the objects. At least a portion of the reflected signal returns to the facet 18 of the utility waveguide 16 as a LIDAR input signal. The LIDAR chip is configured to receive the LIDAR input signal through the facet 18. The portion of the LIDAR input signal that enters the utility waveguide 16 through the facet 18 serve as an incoming LIDAR signal that is guided by the utility waveguide 16. Accordingly, the incoming LIDAR signal includes or consists of light from the LIDAR input signal, the LIDAR output signal, and the outgoing LIDAR signal.

The utility waveguide 16 can include a tapered portion before the facet 18. For instance, the utility waveguide 16 can include a taper 20 that terminate at the facet 18. The taper 20 can relax the alignment tolerances required for efficient coupling of the utility waveguide 16 to the LIDAR input signal and the outgoing LIDAR signal. Accordingly, the taper 20 can increase the percentage of the LIDAR input signal that is successfully returned to the chip for processing. In some instances, the taper 20 is constructed such that the facet 18 has an area that is more than two, five, or ten times the area of a cross section of a straight portion of the utility waveguide 16. Although FIG. 1 shows the taper 20 as a horizontal taper, the taper 20 can be a horizontal and/or vertical taper. The horizontal and/or vertical taper can be linear and/or curved. In some instances, the taper 20 is an adiabatic taper.

The chip includes a data branch 24 where LIDAR data (the distance and/or radial velocity between a LIDAR chip and an object) is added to optical signals. The data branch includes an optical coupler 26 that moves a portion of the light signals from the utility waveguide 16 into the data branch. For instance, an optical coupler 26 couples a portion of the outgoing LIDAR signal from the utility waveguide 16 onto a reference waveguide 27 as a reference signal. The reference waveguide 27 carries the reference signal to a light-combining component 28.

The optical coupler 26 also couples a portion of the incoming LIDAR signal from the utility waveguide 16 onto a comparative waveguide 30 as a comparative signal. As a result, the comparative signal includes or consists of at least a portion of the light from the incoming LIDAR signal. The comparative signal can exclude light from the reference light signal. The comparative waveguide 30 carries the comparative signal to the light-combining component 28.

The illustrated optical coupler 26 is a result of positioning the utility waveguide 16 sufficiently close to the reference waveguide 27 and the comparative waveguide 30 that light from the utility waveguide 16 is coupled into the reference waveguide 27 and the comparative waveguide 30; however, other signal tapping components can be used to move a portion of the of the light signals from the utility waveguide 16 onto the reference waveguide 27 and the comparative waveguide 30. Examples of suitable signal tapping components include, but are not limited to, y-junctions, multi-mode interference couplers (MMIs), and integrated optical circulators.

The light-combining component 28 combines the comparative signal and the reference signal into a composite signal. The reference signal includes light from the outgoing LIDAR signal. For instance, the reference signal can serve as a sample of the outgoing LIDAR signal. The reference signal can exclude light from the LIDAR output signal, the LIDAR input signal and the incoming LIDAR signal. In contrast, the comparative signal includes or consists of at least a portion of the light from the incoming LIDAR signal, the LIDAR input signal, the LIDAR output signal, and the outgoing LIDAR signal. Additionally, the comparative signal can exclude light from the reference light signal. As a result, the comparative signal can serve as a sample of the LIDAR input signal and/or of the incoming LIDAR signal. Accordingly, the comparative signal has been reflected by an object located off of the chip while the reference signal has not been reflected. When the chip and the reflecting object are moving relative to one another, the comparative signal and the reference signal have different frequencies due to the Doppler effect. As a result, beating occurs between the comparative signal and the reference signal.

The resulting composite sample signal is received at a light sensor. For instance, in the LIDAR system of FIG. 1, the light-combining component 28 also splits the resulting composite sample signal onto a first detector waveguide 36 and a second detector waveguide 38. The first detector waveguide 36 carries a first portion of the composite sample signal to a first light sensor 40 that converts the first portion of the composite sample signal to a first electrical signal. The second detector waveguide 38 carries a second portion of the composite sample signal to a second light sensor 42 that converts the second portion of the composite sample signal to a second electrical signal. Examples of suitable light sensors include germanium photodiodes (PDs), and avalanche photodiodes (APDs).

The light combining component 28, the first light sensor 40 and the second light sensor 42 can be connected as a balanced photodetector that outputs an electrical data signal. For instance, the light combining component 28, the first light sensor 40 and the second light sensor 42 can be connected such that the DC components of the signal photocurrents cancel, improving detection sensitivity. Suitable methods for connecting the first light sensor 40 and the second light sensor 42 as balanced photodetectors includes connecting the first light sensor 40 and the second light sensor 42 in series. In one example, the first light sensor 40 and the second light sensor 42 are both avalanche photodiodes connected in series. Balanced photodetection is desirable for detection of small signal fluctuations.

An example of a suitable light-combining component 28 is a Multi-Mode Interference (MMI) device such as a 2×2 MMI device. Other suitable light-combining components 28 include, but are not limited to, adiabatic splitters, and directional coupler. In some instances, the functions of the illustrated light-combining component 28 are performed by more than one optical component or a combination of optical components.

A single light sensor can replace the first light sensor 40 and the second light sensor 42 and can output the data signal. When a single light sensor replaces the first light sensor 40 and the second light sensor 42, the light-combining component 28 need not include light-splitting functionality. As a result, the illustrated light light-combining component 28 can be a 2×1 light-combining component rather than the illustrated 2×2 light-combining component. For instance, the illustrated light light-combining component can be a 2×1 MMI device. In these instances, the chip includes a single detector waveguide that carries the composite sample signal to the light sensor.

The data branch includes a data optical attenuator 44 positioned along the comparative waveguide 30 such that the data optical attenuator 44 can be operated so as to attenuate the comparative signal on the comparative waveguide 30. The chip also includes an output optical attenuator 46 positioned along the utility waveguide 16 such that the output optical attenuator 46 can be operated so as to attenuate the outgoing LIDAR signal on the utility waveguide 16. Suitable attenuators for the data optical attenuator 44 and/or the output optical attenuator 46 are configured to attenuate intensity of a light signal. Examples of a suitable attenuator configured to attenuate intensity of a light signal include carrier-injection based PIN diodes, electro-absorption modulators, and Mach-Zehnder (MZ) modulators.

The chip also includes a sampling directional coupler 50 that couples a portion of the comparative signal from the comparative waveguide 30 onto a sampling waveguide 52. The coupled portion of the comparative signal serves as a sampling signal. The sampling waveguide 52 carries the sampling signal to a sampling light sensor 54. Although FIG. 1 illustrates a sampling directional coupler 50 moving a portion of the comparative signal onto the sampling waveguide 52, other signal tapping components can be used to move a portion of the comparative signal from the comparative waveguide 30 onto the sampling waveguide 52. Examples of suitable signal tapping components include, but are not limited to, y-junctions, and MMIs.

The chip includes a control branch 55 for controlling operation of the laser cavity. The control branch includes a directional coupler 56 that moves a portion of the outgoing LIDAR signal from the utility waveguide 16 onto a control waveguide 57. The coupled portion of the outgoing LIDAR signal serves as a tapped signal. Although FIG. 1 illustrates a directional coupler 56 moving portion of the outgoing LIDAR signal onto the control waveguide 57, other signal-tapping components can be used to move a portion of the outgoing LIDAR signal from the utility waveguide 16 onto the control waveguide 57. Examples of suitable signal tapping components include, but are not limited to, y-junctions, and MMIs.

The control waveguide 57 carries the tapped signal to an interferometer 58 that splits the tapped signal and then re-combines the different portions of the tapped signal with a phase differential between the portions of the tapped signal. The illustrated interferometer 58 is a Mach-Zehnder interferometer; however, other interferometers can be used.

The interferometer 58 outputs a control light signal on an interferometer waveguide 60. The interferometer waveguide 60 carries the control light signal to a control light sensor 61 that converts the control light signal to an electrical signal that serves as an electrical control signal. The interferometer signal has an intensity that is a function of the frequency of the outgoing LIDAR signal. For instance, a Mach-Zehnder interferometer will output a sinusoidal control light signal with a fringe pattern. Changes to the frequency of the outgoing lidar signal will cause changes to the frequency of the control light signal. Accordingly, the frequency of the electrical control signal output from the control light sensor 61 is a function of the change in frequency of the outgoing lidar signal. Other detection mechanisms can be used in place of the control light sensor 61. For instance, the control light sensor 61 can be replaced with a balanced photodetector arranged as the light combining component 28, the first light sensor 40 and the second light sensor 42.

Electronics 62 can operate one or more components on the chip. For instance, the electronics 62 can be in electrical communication with and control operation of the light source 10, the data optical attenuator 44, output optical attenuator 46, the first light sensor 40, the second light sensor 42, the sampling light sensor 54, and the control light sensor 61. Although the electronics 62 are shown off the chip, all or a portion of the electronics can be included on the chip. For instance, the chip can include electrical conductors that connect the first light sensor 40 in series with the second light sensor 42.

During operation of the chip, the electronics 62 operate the light source 10 such that the laser cavity outputs the outgoing LIDAR signal. The electronics 62 then operate the chip through a series of cycles. In some instances, each cycle corresponds to a region in a field of view. For instance, the LIDAR system can be configured to steer the LIDAR output signal to different regions in the field of view and to generate the LIDAR data for all or a portion of the regions.

The cycles can include one or more different time periods. In some instances, different periods are associated with a different waveform for the outgoing LIDAR signal. For instance, the electronics can add chirp to the frequency of the outgoing LIDAR signal and accordingly to the LIDAR output signal(s). The chirp can be different during adjacent periods in a cycle. For instance, the cycles can include one, two, three, or three or more periods that are each selected from a group consisting of a period where the frequency of the outgoing light signal is increased during the period, the frequency of the outgoing light signal is decreased during the period, and the frequency of the outgoing light signal is held constant during the period. In some instances, the increase or decrease in the frequency during a period is a linear function of time. In some instances, the periods are configured such that the waveform of the outgoing LIDAR signal is different in adjacent periods. For instance, when two periods are adjacent to one another in a cycle and the frequency of the outgoing LIDAR signal is increased in each of the two periods, the rate of increase can be different in the two adjacent periods. As will be described in more detail below, the electronics can employ output from the control branch in order to control the frequency of the outgoing LIDAR signal such that the frequency of the outgoing LIDAR signal as a function of time is known to the electronics.

In one example, a cycle includes at least a first period and a second period. During the first period, the electronics 62 can increase the frequency of the outgoing LIDAR signal and during the second period the electronics 62 can decrease the frequency of the outgoing LIDAR signal. For instance, the laser cavity can be configured to output an outgoing LIDAR signal (and accordingly a LIDAR output signal) with a wavelength of 1550 nm. During the first period, the electronics 62 can increase the frequency of the outgoing LIDAR signal (and accordingly a LIDAR output signal) such that the wavelength decreases from 1550 nm to 1459.98 nm followed by decreasing the frequency of the outgoing LIDAR signal such that the wavelength increases from 1459.98 nm to 1550 nm.

When the outgoing LIDAR signal frequency is increased during the first period, the resulting LIDAR output signal travels away from the chip and then returns to the chip as the incoming LIDAR signal. A portion of the incoming LIDAR signal becomes the comparative signal. During the time that the LIDAR output signal and the LIDAR input signal are traveling between the chip and a reflecting object, the frequency of the outgoing LIDAR signal continues to increase. Since a portion of the outgoing LIDAR signal becomes the reference signal, the frequency of the reference signal continues to increase. As a result, the comparative signal enters the light-combining component with a lower frequency than the reference signal concurrently entering the light-combining component. Additionally, the further the reflecting object is located from the chip, the more the frequency of the reference signal increases before the LIDAR input signal returns to the chip. Accordingly, the larger the difference between the frequency of the comparative signal and the frequency of the reference signal, the further the reflecting object is from the chip. As a result, the difference between the frequency of the comparative signal and the frequency of the reference signal is a function of the distance between the chip and the reflecting object.

For the same reasons, when the outgoing LIDAR signal frequency is decreased during the second period, the comparative signal enters the light-combining component with a higher frequency than the reference signal concurrently entering the light-combining component and the difference between the frequency of the comparative signal and the frequency of the reference signal during the second period is also function of the distance between the chip and the reflecting object.

In some instances, the difference between the frequency of the comparative signal and the frequency of the reference signal can also be a function of the Doppler effect because relative movement of the chip and reflecting object can also affect the frequency of the comparative signal. For instance, when the chip is moving toward or away from the reflecting object and/or the reflecting object is moving toward or away from the chip, the Doppler effect can affect the frequency of the comparative signal. Since the frequency of the comparative signal is a function of the speed the reflecting object is moving toward or away from the chip and/or the speed the chip is moving toward or away from the reflecting object, the difference between the frequency of the comparative signal and the frequency of the reference signal is also a function of the speed the reflecting object is moving toward or away from the chip and/or the speed the chip is moving toward or away from the reflecting object. Accordingly, the difference between the frequency of the comparative signal and the frequency of the reference signal is a function of the distance between the chip and the reflecting object and is also a function of the Doppler effect.

The composite sample signal and the data signal each effectively compares the comparative signal and the reference signal. For instance, since the light-combining component combines the comparative signal and the reference signal and these signals have different frequencies, there is beating between the comparative signal and reference signal. Accordingly, the composite sample signal and the data signal have a beat frequency related to the frequency difference between the comparative signal and the reference signal and the beat frequency can be used to determine the difference in the frequency of the comparative signal and the reference signal. A higher beat frequency for the composite sample signal and/or the data signal indicates a higher differential between the frequencies of the comparative signal and the reference signal. As a result, the beat frequency of the data signal is a function of the distance between the chip and the reflecting object and is also a function of the Doppler effect.

As noted above, the beat frequency is a function of two unknowns; the distance between the chip and the reflecting object and the relative velocity of the chip and the reflecting object (i.e., the contribution of the Doppler effect). The change in the frequency difference between the comparative signal and the reference signal ($\Delta f$) is given by $\Delta f = 2\Delta v f/c$ where f is the frequency of the LIDAR output signal and accordingly the reference signal, $\Delta v$ is the relative velocity of the chip and the reflecting object and c is the speed of light in air. The use of multiple different periods permits the electronics 62 to resolve the two unknowns. For instance, the beat frequency determined for the first period is related to the unknown distance and Doppler contribution and the beat frequency determined for the second period is also related to the unknown distance and Doppler contribution. The availability of the two relationships allows the electronics 62 to resolve the two unknowns. Accordingly, the distance between the chip and the reflecting object can be determined without influence from the Doppler effect. Further, in some instances, the electronics 62 use this distance in combination with the Doppler effect to determine the velocity of the reflecting object toward or away from the chip.

In instances where the relative velocity of target and source is zero or very small, the contribution of the Doppler effect to the beat frequency is essentially zero. In these instances, the Doppler effect does not make a substantial contribution to the beat frequency and the electronics 62 can take only the first period to determine the distance between the chip and the reflecting object.

During operation, the electronics 62 can adjust the frequency of the outgoing LIDAR signal in response to the electrical control signal output from the control light sensor 61. As noted above, the magnitude of the electrical control signal output from the control light sensor 61 is a function of the frequency of the outgoing LIDAR signal. Accordingly, the electronics 62 can adjust the frequency of the outgoing LIDAR signal in response to the magnitude of the control. For instance, while changing the frequency of the outgoing LIDAR signal during one of the periods, the electronics 62 can have a range of suitable values for the electrical control signal magnitude as a function of time. At multiple different times during a period, the electronics 62 can compare the electrical control signal magnitude to the range of values associated with the current time in the period. If the electrical control signal magnitude indicates that the frequency of the outgoing LIDAR signal is outside the associated range of electrical control signal magnitudes, the electronics 62 can operate the light source 10 so as to change the frequency of the outgoing LIDAR signal so it falls within the associated range. If the electrical control signal magnitude indicates that the frequency of the outgoing LIDAR signal is within the associated range of electrical control signal magnitudes, the electronics 62 do not change the frequency of the outgoing LIDAR signal.

During operation, the electronics 62 can adjust the level of attenuation provided by the output optical attenuator 46 in response to the sampling signal from the sampling light sensor 54. For instance, the electronics 62 operate the output optical attenuator 46 so as to increase the level of attenuation in response to the magnitude of the sampling signal being above a first signal threshold and/or decrease the magnitude of the power drop in response to the magnitude of the sampling signal being below a second signal threshold.

In some instances, the electronics 62 adjust the level of attenuation provided by the output optical attenuator 46 to prevent or reduce the effects of back-reflection on the performance of the laser cavity. For instance, the first signal threshold and/or the second signal threshold can optionally be selected to prevent or reduce the effects of back-reflection on the performance of the laser cavity. Back reflection occurs when a portion of the incoming LIDAR signal returns to the laser cavity. In some instances, on the order of 50% of the incoming LIDAR signal returns to the laser cavity. The back reflection can affect performance of the laser cavity when the power of the incoming LIDAR signal entering the partial return device 14 does not decrease below the power of the outgoing LIDAR signal exiting from the partial return device 14 ("power drop") by more than a minimum power drop threshold. In the illustrated chip, the minimum power drop threshold can be around 35 dB (0.03%). Accordingly, the incoming LIDAR signal can affect the performance of the laser cavity when the power of the incoming LIDAR signal entering the partial return device 14 is not more than 35 dB below the power of the outgoing LIDAR signal exiting from the partial return device 14.

The electronics 62 can operate the output optical attenuator 46 so as to reduce the effect of low power drops, e.g. when the target object is very close or highly reflective or both. As is evident from FIG. 1, operation of the output optical attenuator 46 so as to increase the level of attenuation reduces the power of the incoming LIDAR signal entering the partial return device 14 and also reduces the power of the outgoing LIDAR signal at a location away from the partial return device 14. Since the output optical attenuator 46 is located apart from the partial return device 14, the power of the outgoing LIDAR signal exiting from the partial return device 14 is not directly affected by the operation of the output optical attenuator 46. Accordingly, the operation of the output optical attenuator 46 so as to increase the level of attenuation increases the level of the power drop. As a result, the electronics can employ the optical attenuator 46 so as to tune the power drop.

Additionally, the magnitude of the sampling signal is related to the power drop. For instance, the magnitude of the sampling signal is related to the power of the comparative signal as is evident from FIG. 1. Since the comparative signal includes light from the incoming LIDAR signal and the LIDAR input signal, the magnitude of the sampling signal is related to the power of the incoming LIDAR signal and the magnitude of the LIDAR input signal. This result means the magnitude of the sampling signal is also related to the power of the incoming LIDAR signal. Accordingly, the magnitude of the sampling signal is related to the power drop.

Since the magnitude of the sampling signal is related to the power drop, the electronics 62 can use the magnitude of the sampling signal to operate the output optical attenuator so as to keep the magnitude of the comparative signal power within a target range. For instance, the electronics 62 can operate the output optical attenuator 46 so as to increase the magnitude of the power drop in response to the sampling signal indicating that the magnitude of power drop is at or below a first threshold and/or the electronics 62 can operate the output optical attenuator 46 so as to decrease the magnitude of the power drop in response to the sampling signal indicating that the magnitude of power drop is at or above a second threshold. In some instances, the first threshold is greater than or equal to the minimum power drop threshold. In one example, the electronics 62 operate the output optical attenuator 46 so as to increase the magnitude of the power drop in response to the magnitude of the sampling signal being above a first signal threshold and/or decrease the magnitude of the power drop in response to the magnitude of the sampling signal being below a second signal threshold. The identification of the value(s) for one, two, three, or four variables selected from the group consisting of the first threshold, the second threshold, the first signal threshold, and the second signal threshold can be determined from calibration of the optical chip during set-up of the LIDAR chip system.

Light sensors can become saturated when the power of the composite light signal exceeds a power threshold. When a light sensor becomes saturated, the magnitude of the data signal hits a maximum value that does not increase despite additional increases in the power of the composite light signal above the power threshold. Accordingly, data can be lost when the power of the composite light signal exceeds a power threshold. During operation, the electronics 62 can adjust the level of attenuation provided by the data optical attenuator 44 so the power of the composite light signal is maintained below a power threshold.

As is evident from FIG. 1, the magnitude of the sampling signal is related to the power of the comparative signal. Accordingly, the electronics 62 can operate the data optical attenuator 44 in response to output from the sampling signal. For instance, the electronics 62 can operate the data optical attenuator so as to increase attenuation of the comparative signal when the magnitude of the sampling signal indicates the power of the comparative signal is above an upper comparative signal threshold and/or can operate the data optical attenuator so as to decrease attenuation of the comparative signal when the magnitude of the sampling signal indicates the power of the comparative signal is below a lower comparative signal threshold. For instance, in some instances, the electronics 62 can increase attenuation of the comparative signal when the magnitude of the sampling signal is at or above an upper comparative threshold and/or the electronics 62 decrease attenuation of the comparative signal when the magnitude of the sampling signal is at or below an upper comparative signal threshold.

As noted above, the electronics 62 can adjust the level of attenuation provided by the output optical attenuator 46 in response to the sampling signal. The electronics 62 can adjust the level of attenuation provided by the data optical attenuator 44 in response to the sampling signal in addition or as an alternative to adjusting the level of attenuation provided by the output optical attenuator 46 in response to the sampling signal.

Figure 2:
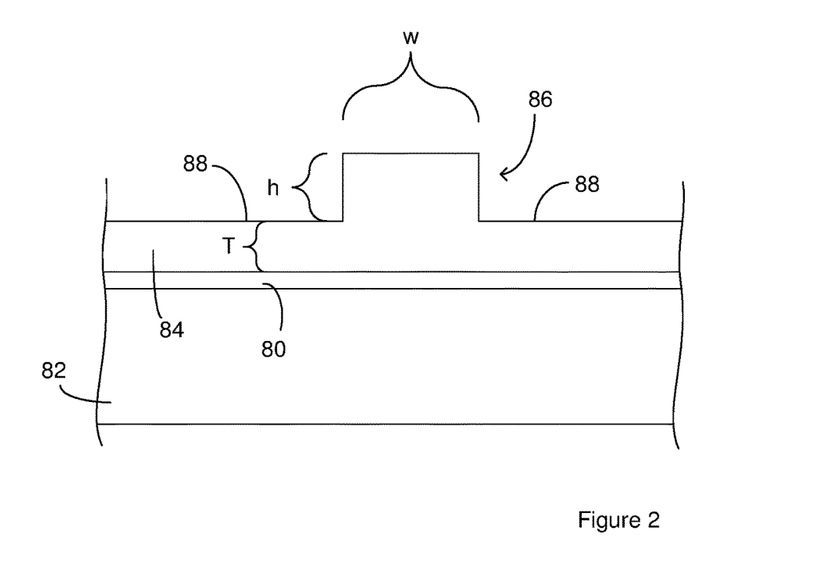
FIG. 2 is a cross-section of a LIDAR chip according to FIG. 1 constructed from a silicon-on-insulator wafer.

Suitable platforms for the chip include, but are not limited to, silica, indium phosphide, and silicon-on-insulator wafers. FIG. 2 is a cross-section of portion of a chip constructed from a silicon-on-insulator wafer. A silicon-on-insulator (SOI) wafer includes a buried layer 80 between a substrate 82 and a light-transmitting medium 84. In a silicon-on-insulator wafer, the buried layer is silica while the substrate and the light-transmitting medium are silicon. The substrate of an optical platform such as an SOI wafer can serve as the base for the entire chip. For instance, the optical components shown in FIG. 1 can be positioned on or over the top and/or lateral sides of the substrate.

The portion of the chip illustrated in FIG. 2 includes a waveguide construction that is suitable for use with chips constructed from silicon-on-insulator wafers. A ridge 86 of the light-transmitting medium extends away from slab regions 88 of the light-transmitting medium. The light signals are constrained between the top of the ridge and the buried oxide layer.

The dimensions of the ridge waveguide are labeled in FIG. 2. For instance, the ridge has a width labeled w and a height labeled h. A thickness of the slab regions is labeled T. For LIDAR applications, these dimensions are more important than other applications because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide while curved portions of the waveguide and/or tapered portions of the waveguide have dimensions outside of these ranges. For instance, the tapered portions of the utility waveguide 16 illustrated in FIG. 1 can have a width and/or height that is >4 µm and can be in a range of 4 µm to 12 µm. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2 is suitable for all or a portion of the waveguides selected from the group consisting of the cavity waveguide 12, utility waveguide 16, reference waveguide 27, comparative waveguide 30, first detector waveguide 36, second detector waveguide 38, sampling waveguide 52, control waveguide 57, and interferometer waveguide 60.

The light source 10 that is interfaced with the utility waveguide 16 can be a gain element that is a component separate from the chip and then attached to the chip. For instance, the light source 10 can be a gain element that is attached to the chip using a flip-chip arrangement.

Use of flip-chip arrangements is suitable when the light source 10 is to be interfaced with a ridge waveguide on a chip constructed from silicon-on-insulator wafer. Examples of suitable interfaces between flip-chip gain elements and ridge waveguides on chips constructed from silicon-on-insulator wafer can be found in U.S. Pat. No. 9,705,278, issued on Jul. 11, 2017 and in U.S. Pat. No. 5,991,484 issued on Nov. 23 1999; each of which is incorporated herein in its entirety. The constructions are suitable for use as the light source 10. When the light source 10 is a gain element, the electronics 62 can change the frequency of the outgoing LIDAR signal by changing the level of electrical current applied to through the gain element.

The attenuators can be a component that is separate from the chip and then attached to the chip. For instance, the attenuator can be included on an attenuator chip that is attached to the chip in a flip-chip arrangement. The use of attenuator chips is suitable for all or a portion of the attenuators selected from the group consisting of the data attenuator and the control attenuator.

As an alternative to including an attenuator on a separate component, all or a portion of the attenuators can be integrated with the chip. For instance, examples of attenuators that are interfaced with ridge waveguides on a chip constructed from a silicon-on-insulator wafer can be found in U.S. Pat. No. 5,908,305, issued on Jun. 1 1999; each of which is incorporated herein in its entirety. The use of attenuators that are integrated with the chip are suitable for all or a portion of the light sensors selected from the group consisting of the data attenuator and the control attenuator.

Light sensors that are interfaced with waveguides on a chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu Ciy, Japan, or an InGaAs APD (Avalanche Photo Diode) manufactured by Hamamatsu located in Hamamatsu City, Japan. These light sensors can be centrally located on the chip as illustrated in FIG. 1. Alternately, all or a portion the waveguides that terminate at a light sensor can terminate at a facet 18 located at an edge of the chip and the light sensor can be attached to the edge of the chip over the facet 18 such that the light sensor receives light that passes through the facet 18. The use of light sensors that are a separate component from the chip is suitable for all or a portion of the light sensors selected from the group consisting of the first light sensor 40, the second light sensor 42, the sampling light sensor 54, and the control light sensor 61.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10 2012; U.S. Pat. No. 8,242,432, issued Aug. 14 2012; and U.S. Pat. No. 6,108,8472, issued on Aug. 22, 2000 each of which is incorporated herein in its entirety. The use of light sensors that are integrated with the chip are suitable for all or a portion of the light sensors selected from the group consisting of the first light sensor 40, the second light sensor 42, the sampling light sensor 54, and the control light sensor 61.

Construction of optical gratings that are integrated with a variety of optical device platforms are available. For instance, a Bragg grating can be formed in a ridge waveguides by forming grooves in the top of the ridge and/or in the later sides of the ridge.

In some instances, it is desirable to scan the LIDAR output signal to different regions in a field of view and to generate the LIDAR data for all or a portion of the regions. The above chip construction is suitable for use with various scanning mechanisms used in LIDAR applications. For instance, the output LIDAR signal can be received by one or more reflecting devices and/or one more collimating devices. The one or more reflecting devices can be configured to re-direct and/or steer the LIDAR output signal so as to provide scanning of the LIDAR output signal. Suitable reflecting devices include, but are not limited to, mirrors such mechanically driven mirrors and Micro Electro Mechanical System (MEMS) mirrors. The one or more collimating devices provide collimation of the LIDAR output signal and can accordingly increase the portion of the LIDAR input signal that is received in the utility waveguide 16. Suitable collimating devices include, but are not limited to, individual lenses and compound lenses.

Figure 3:
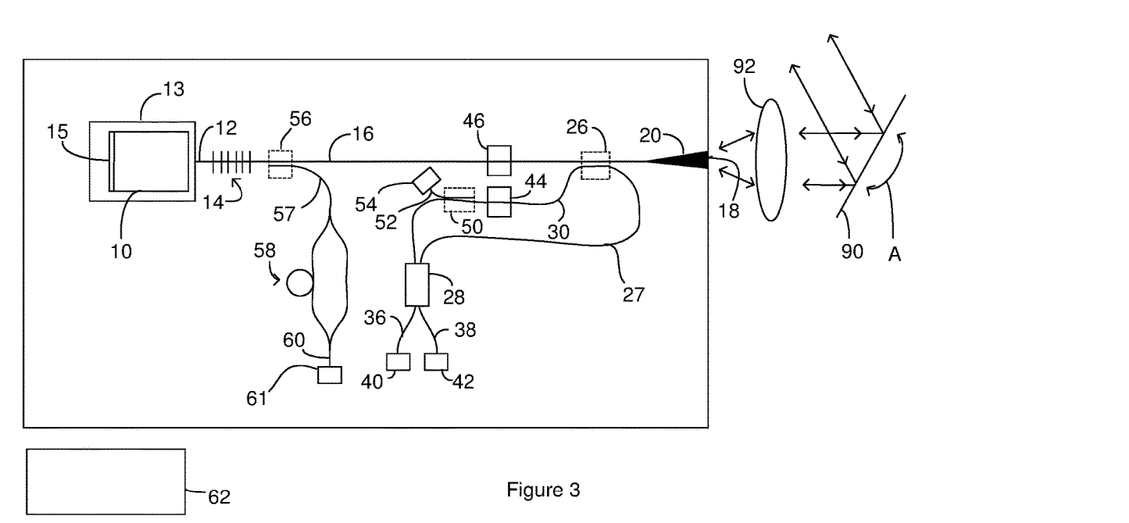
FIG. 3 illustrates the LIDAR chip of FIG. 1 used with an off-chip scanning mechanism.

FIG. 3 illustrates the above chip used with a reflecting device 90 and a collimating device 92. For instance, a lens serves as a collimating device that receives the LIDAR output signal and provides collimation of the LIDAR output signal. A mirror serves as a reflecting device 90 that receives the collimated LIDAR output signal and reflects the collimated LIDAR output signal in the desired direction. As is illustrated by the arrow labeled A, the electronics can move the mirror so as to steer the collimated LIDAR output signal and/or scan the collimated LIDAR output signal. The movement of the mirror can be in one dimension or two dimensions. Suitable mirrors include, but are not limited to, mechanically driven mirrors and Micro Electro Mechanical System (MEMS) mirrors.

Figure 4:
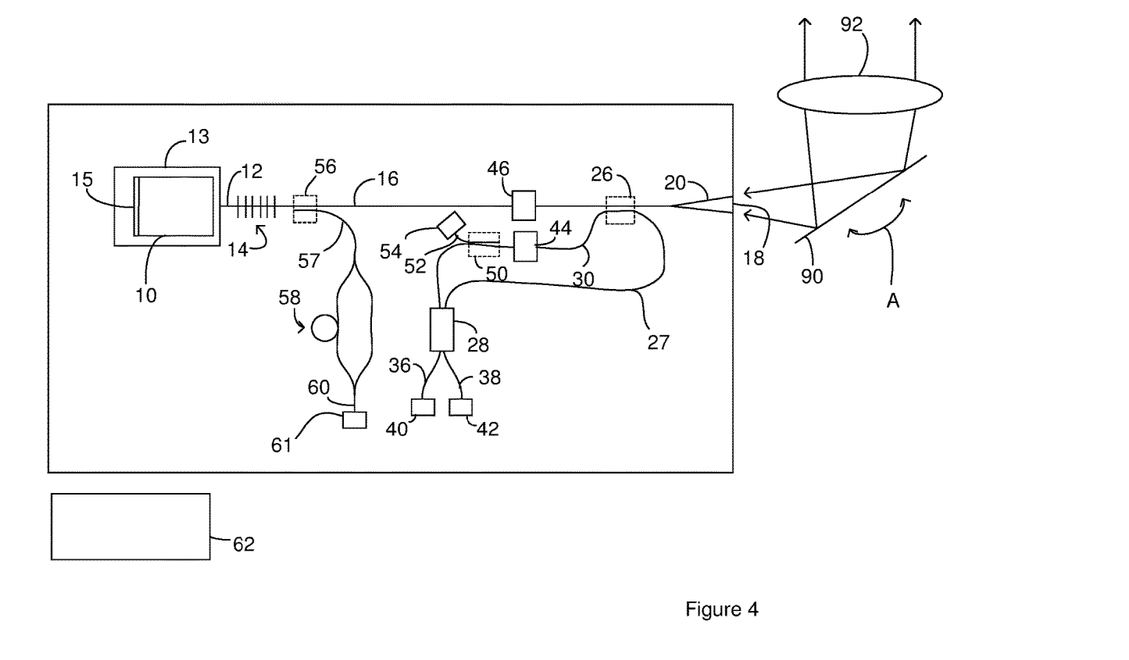
FIG. 4 illustrates the LIDAR chip of FIG. 1 used with another embodiment of an off-chip scanning mechanism.

FIG. 4 illustrates the above chip used with a reflecting device 90 and a collimating device 92. For instance, a mirror serves as a reflecting device 90 that receives the LIDAR output signal and reflects the LIDAR output signal in the desired direction. As is illustrated by the arrow labeled A, the electronics can move the mirror so as to steer the LIDAR output signal and/or scan the LIDAR output signal. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The movement of the mirror can be in one dimension or two dimensions. Suitable mirrors include, but are not limited to, mechanically driven mirrors and Micro Electro Mechanical System (MEMS) mirrors.

Figure 5:
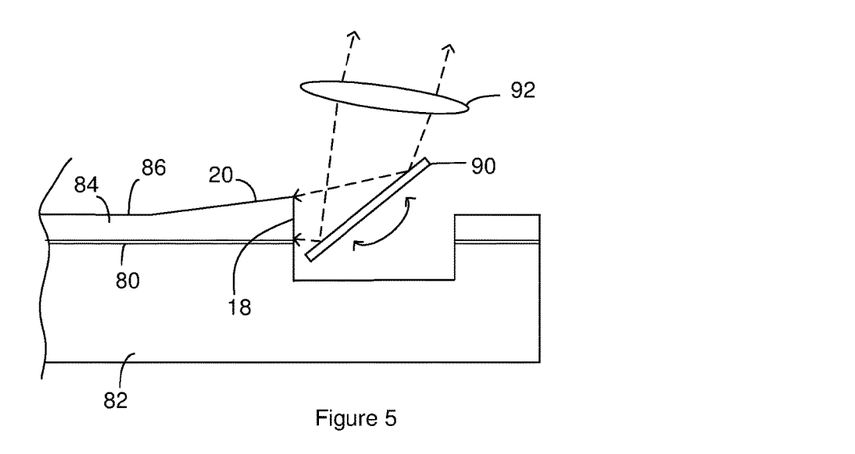
FIG. 5 is a cross section of the LIDAR chip of FIG. 1 having an integrated scanning mechanism.

Technologies such as SOI MEMS (Silicon-On-Insulator Micro Electro Mechanical System) technology can be used to incorporate a reflecting device such as a MEMS mirror into the chip. For instance, FIG. 5 is a cross section of a portion of the chip taken through the longitudinal axis of the utility waveguide 16. The illustrated chip was constructed on silicon-on-insulator waveguide. A mirror recess extends through the light-transmitting medium to the base. The mirror is positioned in the mirror recess such that the mirror receives the LIDAR output signal from the utility waveguide. A lens serves as a collimating device 92 that receives the LIDAR output signal from the mirror and provides collimation of the LIDAR output signal. The lens can be configured to move with the movement of the mirror so the lens continues to receive the LIDAR output signal at different positions of the mirror. Alternately, the movement of the mirror can be sufficiently limited that the lens continues to receive the LIDAR output signal at different positions of the mirror. The electronics can control movement of the mirror in one dimension or two dimensions.

Figure 6A:
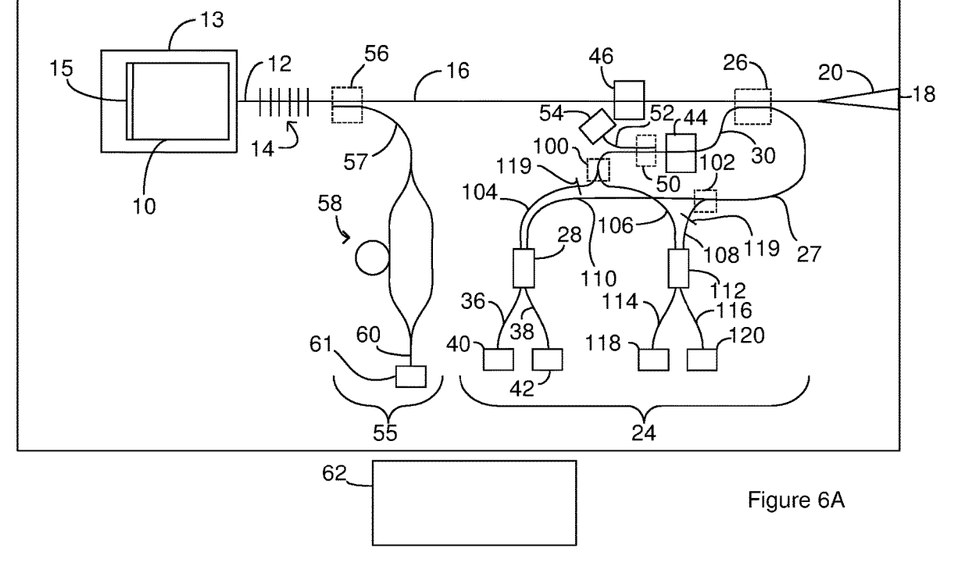
FIG. 6A illustrates the chip of FIG. 1 modified to include multiple different balanced detectors for further refining data generated by the chip.

The chips can be modified so that data branch includes one or more secondary branches and one or more secondary balanced detectors that can be employed to refine the optical data provided to the electronics. The reference signal and the comparative signal can be divided among the different balanced detectors. For instance, FIG. 6A illustrates the above chip modified to include two different balanced detectors. A first splitter 102 divides the reference signal carried on the reference waveguide 27 onto a first reference waveguide 110 and a second reference waveguide 108. The first reference waveguide 110 carries a first portion of the reference signal to the light-combining component 28. The second reference waveguide 108 carries a second portion of the reference signal to a second light-combining component 112.

A second splitter 100 divides the comparative signal carried on the comparative waveguide 30 onto a first comparative waveguide 104 and a second comparative waveguide 106. The first comparative waveguide 104 carries a first portion of the comparative signal to the light-combining component 28. The second comparative waveguide 108 carries a second portion of the comparative signal to the second light-combining component 112.

The light-combining component 28 combines the first portion of the comparative signal and the first portion of the reference signal into composite signal. The light-combining component 28 also splits the composite signal onto the first detector waveguide 36 and the second detector waveguide 38. As noted above, the first detector waveguide 36 carries the first portion of the composite sample signal to the first light sensor 40 which converts the first portion of the composite sample signal to a first electrical signal. The second detector waveguide 38 carries the second portion of the composite sample signal to the second light sensor 42 which converts the second portion of the composite sample signal to a second electrical signal.

The second light-combining component 112 combines the second portion of the comparative signal and the second portion of the reference signal into a second composite signal. The second light-combining component 112 also splits the second composite signal onto a first auxiliary detector waveguide 114 and a second auxiliary detector waveguide 116. The first auxiliary detector waveguide 114 carries a first portion of the second composite signal to a first auxiliary light sensor 118 that converts the first portion of the second composite signal to a first auxiliary electrical signal. The second auxiliary detector waveguide 116 carries a second portion of the second composite signal to a second auxiliary light sensor 120 that converts the second portion of the second composite signal to a second auxiliary electrical signal. Examples of suitable light sensors include germanium photodiodes (PDs), and avalanche photodiodes (APDs).

The first reference waveguide 110 and the second reference waveguide 108 are constructed to provide a phase shift between the first portion of the reference signal and the second portion of the reference signal. For instance, the first reference waveguide 110 and the second reference waveguide 108 can be constructed so as to provide a 90° phase shift between the first portion of the reference signal and the second portion of the reference signal. Accordingly, one of the reference signal portions can be a sinusoidal function and the other reference signal portion can be a cosinusoidal function. In one example, the first reference waveguide 110 and the second reference waveguide 108 are constructed such that the first reference signal portion is a cosine function and the second reference signal portion is a sinusoidal function. Accordingly, the portion of the reference signal in the first composite signal is phase shifted relative to the portion of the reference signal in the second composite signal, however, the portion of the comparative signal in the first composite signal is not phase shifted relative to the portion of the comparative signal in the second composite signal. As a result, the first composite signal and the second composite signal can act as the components of a complex composite signal. For instance, the first composite signal can be an in-phase component of the complex composite signal and the second composite signal can be the quadrature component of the complex composite signal. In these examples a particular relationship is not required between the phase of the portion of the reference signal in the first composite signal and the portion of the comparative signal in the first composite signal and/or between the phase of the portion of the reference signal in the second composite signal and the portion of the comparative signal in the second composite signal.

In one example, the portion of the reference signal in the first composite signal is phase-shifted relative to the portion of the reference signal in the second composite signal but the portion of the comparative signal in the first composite signal is in-phase with the portion of the comparative signal in the second composite signal.

The desired phase shift can be a result of a length differential between the length of the first reference waveguide 110 and the second reference waveguide 108. In some instances, the length differential is on the order of 0.05-0.3 microns in order to achieve the desired phase shift such as a 90° phase shift. The desired length differential can be a function of wavelength.

In some instances, depending on the layout of the LIDAR chip, there are one or more intersections that are each between two waveguides selected from the waveguide group consisting of the first comparative waveguide 104, the second comparative waveguide 106, the first reference waveguide 110 and the second reference waveguide 108. For instance, FIG. 6A illustrates an intersection between the second comparative waveguide 106 and the first reference waveguide 110. The waveguide intersection can affect the effective index of refraction of the intersection waveguides. As a result, one or more dummy waveguides 119 can optionally be added to one or more of the waveguides in the waveguide groups so as to bring each waveguide to the same number of intersections. For instance, in the layout of FIG. 6A, the first comparative waveguide 104 and the second reference waveguide 108 do not have an intersection. As a result, a dummy waveguide 119 is added to the first comparative waveguide 104 and the second reference waveguide 108 so as to provide each waveguide in the waveguide groups with the same number of intersections. Providing each waveguide in the waveguide group with the same number of intersections allows the phase difference between the light signals carried in these waveguides to be controlled. The dummy waveguides can each be constructed such that any light guided within the dummy waveguide is not guided to other components on the LIDAR chip and/or to other waveguides on the LIDAR chip. Accordingly, light guided within the dummy waveguides is not processed by the LIDAR chip. As a result, the dummy waveguides can include two terminal ends as illustrated in FIG. 6A.

Figure 6B:
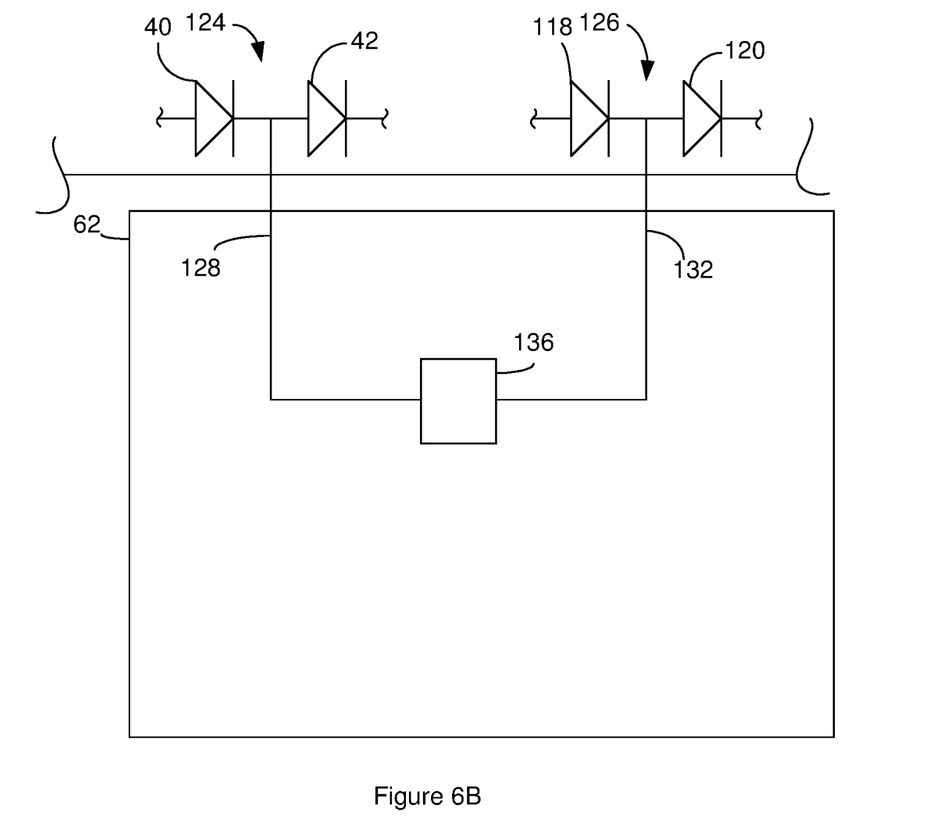
FIG. 6B provides a schematic of electronics that are suitable for use with the chip of FIG. 6A.

The first light sensor 40 and the second light sensor 42 can be connected as a balanced detector and the first auxiliary light sensor 118 and the second auxiliary light sensor 120 can also be connected as a balanced detector. For instance, FIG. 6B provides a schematic of the relationship between the electronics, the first light sensor 40, the second light sensor 42, the first auxiliary light sensor 118, and the second auxiliary light sensor 120. The symbol for a photodiode is used to represent the first light sensor 40, the second light sensor 42, the first auxiliary light sensor 118, and the second auxiliary light sensor 120 but one or more of these sensors can have other constructions.

The electronics connect the first light sensor 40 and the second light sensor 42 as a first balanced detector 124. In particular, the first light sensor 40 and the second light sensor 42 are connected in series. The first balanced detector 124 acts as a light sensor that converts the first composite signal to an electrical signal (a first data signal) carried on a first data line 128. Additionally, the electronics connect the first auxiliary light sensor 118 and the second auxiliary light sensor 120 as a second balanced detector 126. In particular, the first auxiliary light sensor 118 and the second auxiliary light sensor 120 are connected in series. The second balanced detector 124 acts as a light sensor that converts the second composite signal to an electrical signal (a second data signal) carried on a second data line 132.

The first data line 128 carries the first data signal to a transform module 136 and the second data line 132 carries the second data signal to the transform module 136. The transform module is configured to perform a complex transform on a complex signal so as to convert the input from the time domain to the frequency domain. The first data signal can be the real component of the complex signal and the second data signal can be the imaginary component of the complex signal. The transform module can execute the attributed functions using firmware, hardware and software or a combination thereof.

Figure 6C:
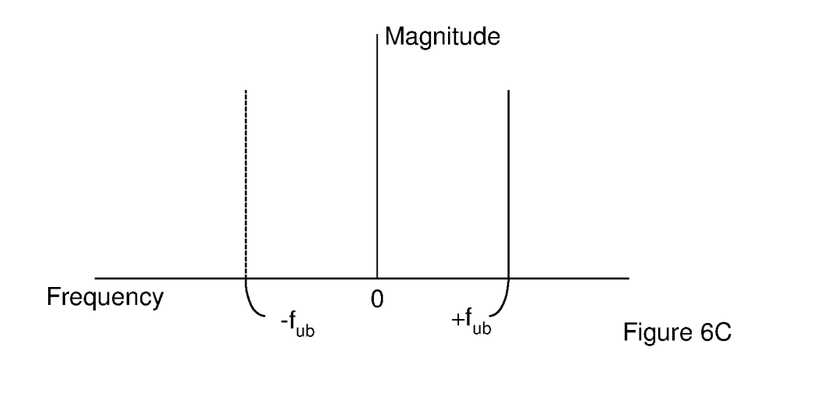
FIG. 6C is a graph of magnitude versus frequency. A solid line on the graph shows results for a Complex Fourier transform performed on output generated from the LIDAR chip of FIG. 6B.

The solid line in FIG. 6C provides an example of the output of the transform module when a Complex Fourier transform converts the input from the time domain to the frequency domain. The solid line shows a single frequency peak. The frequency associated with this peak is used by the electronics as the frequency of the LIDAR input signal and/or as the frequency of the incoming LIDAR signal.

The electronics use this frequency for further processing to generate the LIDAR data (distance and/or radial velocity between the reflecting object and the LIDAR chip or LIDAR system). FIG. 6C also includes a second peak illustrated by a dashed line. Prior methods of resolving the frequency of the LIDAR input signal made use of real Fourier transforms rather than the Complex Fourier transform technique disclosed above. These prior methods output both the peak shown by the dashed line and the solid line. As noted above, when using LIDAR applications, it can become difficult to identify the correct peak. Since the above technique for resolving the frequency generates a single solution for the frequency, the inventors have resolved the ambiguity with the frequency solution.

The electronics use the single frequency that would be present in FIG. 6C to determine the distance of the reflecting object from the chip and/or the relative speed of the object and the chip. For instance, the following equation applies during a period where electronics linearly increase the frequency of the outgoing LIDAR signal during the period: $+f_{ub}=f_d+\alpha\tau_0$ where $f_{ub}$ is the frequency provided by the transform module, $f_d$ represents the Doppler shift ($f_d=2vf_c/c$) where $f_c$ is the frequency of the LIDAR output signal at the start of the period (i.e. t=0), v is the radial velocity between the reflecting object and the LIDAR chip where the direction from the reflecting object toward the chip is assumed to be the positive direction, and c is the speed of light, a represents the rate at which the frequency of the outgoing LIDAR signal is increased or decreased during the period, and $\tau_0$ is the roundtrip delay (time between the LIDAR output signal exiting from the LIDAR chip and the associated LIDAR input signal returning to the LIDAR chip) for a stationary reflecting object. The following equation applies during a period where electronics decrease the frequency of the outgoing LIDAR signal: $-f_{db}=-f_d-\alpha\tau_0$ where $f_{db}$ is the frequency provided by the transform module. In these two equations, v and $\tau_0$ are unknowns. The radial velocity can then be determined from the Doppler shift and the separation distance can be determined from $c*\tau_0/2$.

Above, the complex composite signal is described as having an in-phase component and a quadrature component that include out-of-phase portions of the reference signal; however, the unambiguous LIDAR data solution can be achieved by generating other complex composite signals. For instance, the unambiguous LIDAR data solution can be achieved using a complex composite signal where the in-phase component and the quadrature component include out-of-phase portions of the comparative signal. For instance, the first comparative waveguide 104 and the second comparative waveguide 106 can be constructed so as to provide a 90 degree phase shift between the first portion of the comparative signal and the second portion of the comparative signal but the first reference waveguide 110 and the second reference waveguide 108 are constructed such that the first portion of the reference signal and the second portion of the reference signal are in-phase in the composite signals. Accordingly, the portion of the comparative signal in the first composite signal is phase shifted relative to the portion of the comparative signal in the second composite signal, however, the portion of the reference signal in the first composite signal is not phase shifted relative to the portion of the reference signal in the second composite signal.

Example 1

The mathematics for a LIDAR system where the portion of the reference signal in the first composite signal is out of phase by 90° relative to the portion of the reference signal in the second composite signal and the portion of the comparative signal in the first composite signal is in-phase with the portion of the comparative signal in the second composite signal are set forth in this example. The electronics operate the LIDAR system with cycles that have a first period and a second period. During the first period, the frequency of the LIDAR output signal is ramped up. During the second period, the frequency of the LIDAR output signal is ramped down.

The roundtrip time can be mathematically expressed as the following equation 1:

$$\tau(t) = \frac{2R0}{c} - \frac{2v}{c}t = \tau_0 - \frac{2v}{c}t$$

where RO represents the initial distance of the object from the LIDAR system, c represents the speed of light, $\tau_0=2RO/c$ represents the roundtrip delay for a stationary target in seconds, v is the radial velocity, and t represents time where the time is zero when at the start of the period. Assuming the direction from the object to the LIDAR system as the positive direction, v will be positive when the target and transmitter move towards each other and negative when the target and transmitter move away from each other.

When an unmodulated LIDAR output signal is represented by a sinusoid such as $\cos(2\pi f_e t)$, with $f_e$ representing the frequency of the sinusoid and t representing time, the LIDAR input signal can be represented by $\cos(2\pi f_e t+\Phi(t))$, where $\Phi(t)$ is the phase of the LIDAR input signal relative to the transmitted signal and is given by the following equation 2:

$$\Phi(t) = -2\pi f_c \tau(t) = -2\pi f_c \tau_0 + 2\pi\left(\frac{2v}{c}f_c\right)t.$$

Substituting this phase into the equation for the LIDAR input signal provides the following Equation 3: $S_{rx}(t) \propto \cos(2\pi(f_c+f_d)t-2\pi f_c T_0)$ where $f_d=2vf_c/c$ is known as the Doppler frequency shift and can be positive or negative depending on the radial velocity of the object. The roundtrip delay can now be rewritten in terms of $f_d$ and $\tau_0$ as the following Equation 4:

$$\tau(t) = \frac{2R0}{c} - \frac{2v}{c}t = \tau_0 - \frac{f_d}{f_c}t.$$

When $\tau_0$ and $f_d$ are measured, this equation can be used to evaluate RO and v. The above LIDAR system is used to measure $\tau_0$ and $f_d$.

As noted above, the outgoing LIDAR signal can be modulated such that chirp is added to the outgoing LIDAR signal during one or more periods in a cycle. When chirp is added to the outgoing LIDAR signal, the frequency of the outgoing LIDAR signal can be represented by the following Equation 5: $f(t)=f_c+\alpha t$ where $f_c$ is the frequency of the outgoing LIDAR signal without the added chirp, t is time and t=0 at the start of the period, and a is the rate at which the frequency of the outgoing LIDAR signal is changed during the period. The phase of the outgoing LIDAR signal (in radians per second) may be obtained by integrating equation 5 as shown in the following Equation 6: $\Phi(t)=2\pi\int f(t)\cdot dt = 2\pi f_c t + \pi\alpha t^2$. As a result, the outgoing LIDAR signal can be expressed as the following Equation 7: $S_{tx}(t)=\sqrt{P}\cos(2\pi f_c t+\pi\alpha t^2)$ where $\sqrt{P}$ is the power of the LIDAR output signal. The resulting LIDAR input signal upon return to the LIDAR system (i.e. at the facet or after undergoing the roundtrip delay $\tau$ defined above by Equation 1) and propagation attenuation $\beta$ can be represented by the following equation 8: $S_{rx}(t)=\sqrt{BP}\cos(2\pi f_c(t-\tau)+\pi\alpha(t-\tau)^2)$.

As described above, a portion of the LIDAR input signal is mixed with an in-phase version of a reference signal and another portion of the LIDAR input signal is mixed with the quadrature version of the reference signal (i.e., complex mixing). The resulting reference signal may then be represented by adapting Equation 6 as shown in the following Equation 8: $S_{ref}(t)=(\sqrt{P\gamma/2}\cos(2\pi f_c t+\pi\alpha t^2), \sqrt{P\gamma/2}\sin(2\pi f_c t+\pi\alpha t^2))$ where $\gamma$ represents a ratio of the power of the reference signal power to the power of the LIDAR output signal. In Equation 8, the first term represents the in-phase portion of the reference signal and the second term represents the quadrature portion of the reference signal.

As described above, the reference signal and the comparative signal (the LIDAR input signal) are combined to provide a complex and beating composite signal. During the first period, the complex composite signal can be represented by the following Equation 9:

$$I_{ub} + jQ_{ub} \approx \frac{P}{4}\sqrt{\gamma\beta}\cos(2\pi f_c\tau_0 - 2\pi f_d t + 2\pi\alpha\tau_0 t) + j\frac{P}{4}\sqrt{\gamma\beta}\sin(2\pi f_c\tau_0 - 2\pi f_d t + 2\pi\alpha\tau_0 t)$$

where $I_{ub}$ represents the first composite signal and/or the first data signal and $Q_{ub}$ represents the second composite signal and/or the second data signal. When written in exponential format, the complex beat signal during the first period can be represented by the following Equation 10:

$$I_{ub} + jQ_{ub} \approx \frac{P}{4}\sqrt{\gamma\beta}\exp(j(2\pi f_c\tau_0 - 2\pi f_d t + 2\pi\alpha\tau_0 t)).$$

As the beat signal is complex and no longer real, the frequency of its spectral peak is uniquely expressed by the following Equation 11: $F_{ub}=-f_d+\alpha\tau_0$ where $F_{ub}$ can be positive, negative or zero.

During the second period, the complex composite signal can be represented by the following Equation 12:

$$I_{db} + jQ_{db} \approx \frac{P}{4}\sqrt{\gamma\beta}\cos(2\pi f_c\tau_0 - 2\pi f_d t - 2\pi\alpha\tau_0 t) + j\frac{P}{4}\sqrt{\gamma\beta}\sin(2\pi f_c\tau_0 - 2\pi f_d t - 2\pi\alpha\tau_0 t)$$

where $I_{db}$ represents the first composite signal and/or the first data signal and $Q_{db}$ represents the second composite signal and/or the second data signal. When written in exponential format, the complex beat signal during the second period can be represented by the following Equation 13:

$$I_{db} + jQ_{db} \approx \frac{P}{4}\sqrt{\gamma\beta}\exp(j(2\pi f_c\tau_0 - 2\pi f_d t - 2\pi\alpha\tau_0 t))$$

with the corresponding beat frequency given by the following Equation 14: $F_{db}=-f_d-\alpha\tau_0$. The unambiguous solutions to Equation 11 and Equation 14 are represented by:

$$f_d = -\frac{F_{ub} + F_{db}}{2} \quad \tau_0 = +\frac{F_{ub} - F_{db}}{2\alpha}.$$

The LIDAR data (radial distance and velocity) can be calculated without ambiguity as follows:

$$R0 = \frac{c\tau_0}{2} \quad v = \frac{cf_d}{2f_c}.$$

Suitable electronics can include, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

A single light sensor can replace the second balanced detector first light sensor 40 and the second light sensor 42 and/or a second light sensor can replace the first auxiliary light sensor 118 and the second auxiliary light sensor 120. When a single light sensor replaces the first light sensor 40 and the second light sensor 42, the light-combining component 28 need not include light-splitting functionality. As a result, the illustrated light light-combining component 28 can be a 2×1 light-combining component rather than the illustrated 2×2 light-combining component. For instance, the illustrated light light-combining component can be a 2×1 MMI device. In these instances, the chip includes a single detector waveguide that carries the composite signal to the light sensor.

When a single light sensor replaces the first auxiliary light sensor 118 and the second auxiliary light sensor 120, second light-combining component 112 need not include light-splitting functionality. As a result, the illustrated second light-combining component 112 can be a 2×1 light-combining component rather than the illustrated 2×1 light-combining component. For instance, the illustrated light light-combining component can be a 2×1 MMI device. In these instances, the chip includes a single detector waveguide that carries the composite signal from the second light-combining component 112 to the light sensor.

Suitable electronics can include, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the laser cavity is shown as being positioned on the chip, all or a portion of the laser cavity can be located off the chip. For instance, the utility waveguide 16 can terminate at a second facet through which the outgoing LIDAR signal can enter the utility waveguide 16 from a laser cavity located off the chip.

The chip can include components in addition to the illustrated components. As one example, optical attenuators (not illustrated) can be positioned along the first detector waveguide 36 and the second detector waveguide 38. The electronics can operate these attenuators so the power of the first portion of the composite sample signal that reaches the first light sensor 40 is the same or about the same as the power of the second portion of the composite sample signal that reaches the second light sensor 42. The electronics can operate the attenuators in response to output from the first light sensor 40 which indicates the power level of the first portion of the composite sample signal and the second light sensor 42 which indicates the power level of the second portion of the composite sample signal.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A LIDAR system, comprising:
a utility waveguide that carries an outgoing LIDAR signal to a facet through which the outgoing LIDAR signal exits from the LIDAR system;
an optical component combines a first portion of a reference signal with a first portion of a comparative signal so as to form a first composite signal,
the reference signal includes a portion of the light from the outgoing LIDAR signal before the outgoing LIDAR signal exits from the LIDAR system, and
the comparative signal includes light from the outgoing LIDAR that was reflected off an object located remote from the LIDAR system; and
a second optical component combines a second portion of the reference signal with a second portion of the comparative signal so as to form a second composite signal,
the first portion of the reference signal in the first composite signal being out of phase with the second portion of the reference signal in the second composite signal.

2. The LIDAR system of claim 1, wherein the first portion of the comparative signal in the first composite signal is in-phase with the second portion of the comparative signal in the second composite signal.

3. The LIDAR system of claim 1, wherein the first portion of the reference signal in the first composite signal is 90° out of phase with the second portion of the reference signal in the second composite signal.

4. The LIDAR system of claim 1, wherein the first composite signal is converted from an optical signal to a first data signal, the first data signal being an electrical signal, and
the second composite signal is converted from an optical signal to a second data signal, the second data signal being an electrical signal.

5. The LIDAR system of claim 4, wherein the first data signal and the second data signal are received by a Complex Fourier transform module configured to perform a Complex Fourier transform on a complex signal with
a real component of the complex signal being selected from a group consisting of the first data signal and the second data signal and
an imaginary component of the complex signal being selected from a group consisting of the first data signal and the second data signal, and
the data signal that is selected as the real component is not also selected as the imaginary component.

6. The LIDAR system of claim 5, wherein electronics generate LIDAR data from an output of the Complex Fourier transform, the LIDAR data indicating a distance and/or radial velocity between the facet and the object.

7. A LIDAR system, comprising:
a utility waveguide that carries an outgoing LIDAR signal to a facet through which the outgoing LIDAR signal exits from the LIDAR system;
an optical component combines a first portion of a reference signal with a first portion of a comparative signal so as to form a first composite signal,
the reference signal includes a portion of the light from the outgoing LIDAR signal before the outgoing LIDAR signal exits from the LIDAR system, and
the comparative signal includes light from the outgoing LIDAR that was reflected off an object located remote from the LIDAR system; and
a second optical component combines a second portion of the reference signal with a second portion of the comparative signal so as to form a second composite signal,
the first portion of the comparative signal in the first composite signal being out of phase with the second portion of the comparative signal in the second composite signal.

8. The LIDAR system of claim 7, wherein the first portion of the reference signal in the first composite signal is in-phase with the second portion of the reference signal in the second composite signal.

9. The LIDAR system of claim 8, wherein the first portion of the comparative signal in the first composite signal is 90° out of phase with the second portion of the comparative signal in the second composite signal.

10. A LIDAR system comprising:
optics that generate a light signal that carries LIDAR data, the LIDAR data indicating a distance and/or radial velocity between the optics and an object located outside of the LIDAR system;
electronics configured to convert the light signal to a first data electrical signal and a second data electrical signal, the electronics performing a Complex Fourier transform on a complex signal, the first data electrical signals being a real component of the complex signal and the second data electrical signals being an imaginary component of the complex signal.

11. The system of claim 10, wherein the optics are included on a LIDAR chip.

12. The system of claim 10, wherein a first component of the first data electrical signal is phase shifted relative to a phase of a first component of the second data electrical signal and a second component of the first data electrical signal is not phase shifted relative to the phase of the second component of the second data electrical signal.

13. The system of claim 7, wherein generating the light signal includes combining a reference light signal with a comparative light signal,
the reference signal and the comparative signal each including light from an outgoing LIDAR signal that exits from the LIDAR system,
the light from the outgoing LIDAR signal that is included in the reference signal having not exited from the LIDAR system but the light from the outgoing LIDAR signal that is included in the comparative signal having exited from the LIDAR system and returned to the LIDAR system.

14. A method of operating a LIDAR system, comprising:
generating multiple data electrical signals from a light signal that carries LIDAR data, the LIDAR data indicating a distance and/or radial velocity between a source of a LIDAR output signal and an object that reflects the LIDAR output signal;
performing a Complex Fourier transform on a complex signal such that a first one of the data electrical signals is a real component of the complex signal and a second one of the data electrical signals is an imaginary component of the complex signal; and
using an output from the Complex Fourier transform to determine the distance and/or radial velocity between the source and the object.

15. The method of claim 14, wherein a first component of the first data electrical signal is phase shifted relative to a phase of a first component of the second data electrical signal and the second component of the second data electrical signal is not phase shifted relative to the phase of the second component of the second data electrical signal.

16. The method of claim 14, further comprising:
generating the light signal before generating the data electrical signals, generating the light signal including combining a reference signal and comparative signal,
the reference signal and the comparative signal each including light from an outgoing LIDAR signal that exits from the LIDAR system,
the light from the outgoing LIDAR signal that is included in the reference signal having not exited from the LIDAR system but the light from the outgoing LIDAR signal that is included in the comparative signal having exited from the LIDAR system and returned to the LIDAR system.

* * * * *